United States Patent [19]

Mewissen et al.

[11] Patent Number: 5,386,491
[45] Date of Patent: Jan. 31, 1995

[54] ELECTRICAL APPLIANCE WITH U-SHAPED LAMPS HAVING FILAMENTS OF DIFFERENT POWER CONSUMPTION

[75] Inventors: Jan A. C. Mewissen, Eindhoven, Netherlands; Emiel M. Boeckx, Turnhout, Belgium

[73] Assignee: U.S. Philips Corporation, New York, N.Y.

[21] Appl. No.: 166,653

[22] Filed: Dec. 13, 1993

Related U.S. Application Data

[63] Continuation of Ser. No. 909,241, Jul. 6, 1992, abandoned.

[30] Foreign Application Priority Data

Jul. 8, 1991 [EP] European Pat. Off. ........... 91201767

[51] Int. Cl.[6] .................. A47J 37/06; H05B 3/00
[52] U.S. Cl. .................. 392/418; 392/407; 219/411; 338/235; 313/316
[58] Field of Search ........... 392/418, 416, 424, 407; 219/405, 411, 464, 465, 466; 338/235; 313/315, 316

[56] References Cited

U.S. PATENT DOCUMENTS

| | | | |
|---|---|---|---|
| 1,560,265 | 11/1925 | Lely, Jr. ................. | 313/315 |
| 1,897,197 | 2/1933 | Jolas ..................... | 392/407 |
| 3,313,921 | 4/1967 | Mohn et al. .............. | 392/407 |
| 3,346,723 | 10/1967 | Mohn et al. .............. | 392/407 |
| 3,417,230 | 12/1968 | Millikan ................. | 392/407 |
| 3,543,002 | 11/1970 | Poole .................... | 392/407 |
| 3,627,989 | 12/1971 | Heidler et al. ........... | 219/411 |
| 3,912,905 | 10/1975 | Giler .................... | 219/464 |
| 4,414,484 | 11/1983 | Notelteirs et al. ........ | 313/315 |
| 4,758,710 | 7/1988 | Crossley et al. .......... | 219/461 |
| 4,857,709 | 8/1989 | Janssens et al. .......... | 219/464 |
| 4,959,586 | 9/1990 | Claessens et al. ......... | 313/273 |
| 5,091,632 | 2/1992 | Hennecke et al. .......... | 392/407 |

FOREIGN PATENT DOCUMENTS

258069 2/1939 Italy ..................... 219/464

Primary Examiner—Bruce A. Reynolds
Assistant Examiner—John A. Jeffery
Attorney, Agent, or Firm—Ernestine C. Bartlett

[57] ABSTRACT

An elctrical appliance for preparing food is provided which contains several incandescent lamps (2, 2') disposed side by side. Incandescent lamps (2, 2') for use in the appliance have a U-shaped tubular lamp vessel (4) in the first (8) and the second leg (9) of which a first (10), and, a second portion (11) respectively of an incandescent body (5) is accommodated. The first portion (10) consumes a higher power than the second portion (11). In the appliance the lamps (2, 2') are arranged with the second filament portions (11) adjacent to each other. Thereby, a more homogeneous irradiation of a carrier (3) for food is obtained.

12 Claims, 1 Drawing Sheet

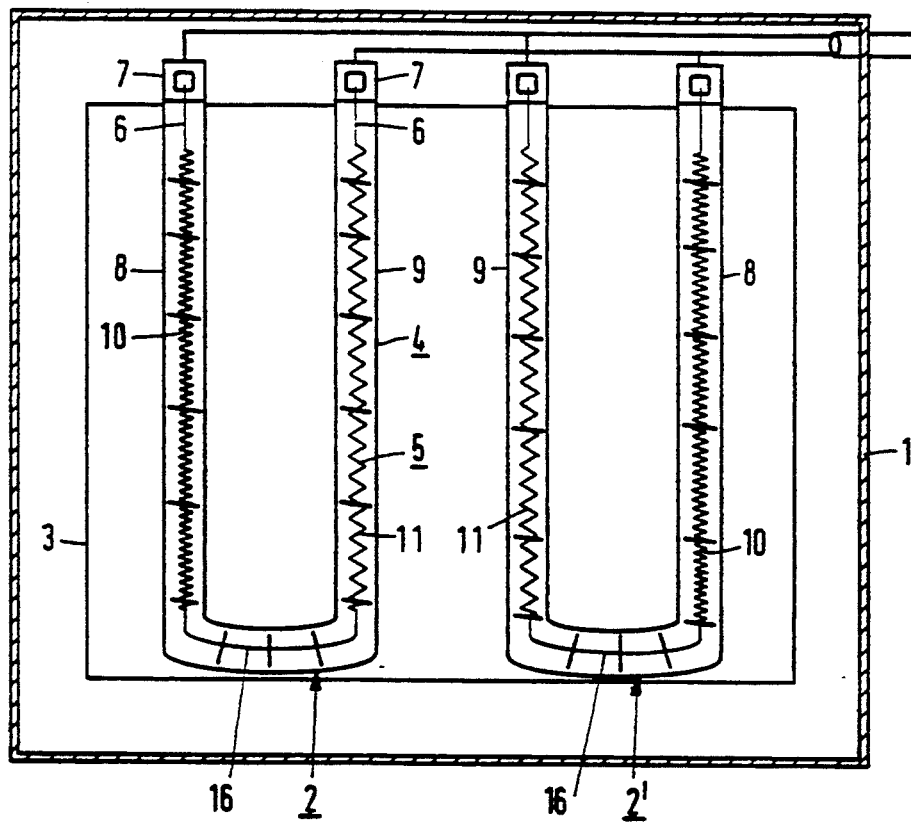
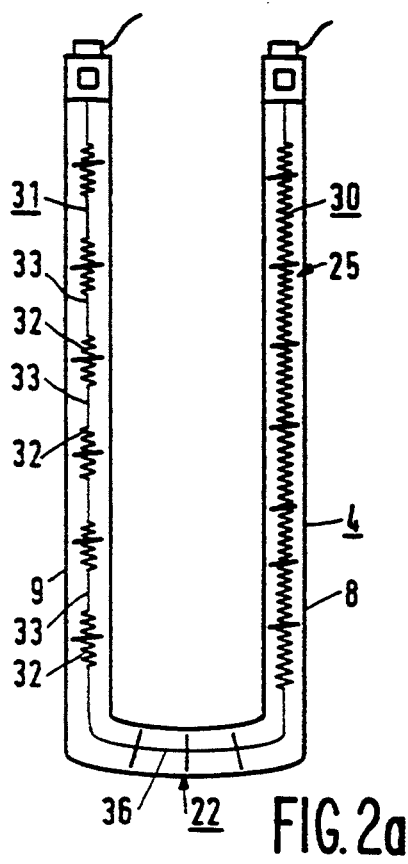 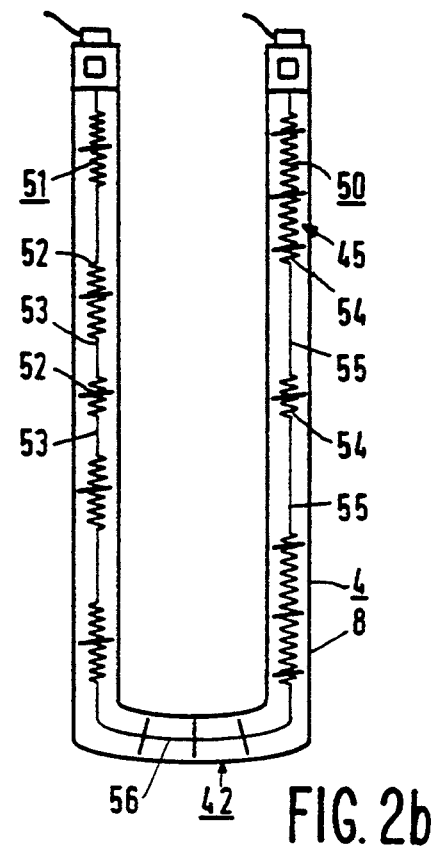

ELECTRICAL APPLIANCE WITH U-SHAPED LAMPS HAVING FILAMENTS OF DIFFERENT POWER CONSUMPTION

This is a continuation of application Ser. No. 07/909,241, filed Jul. 6, 1992 now abandoned

FIELD OF THE INVENTION

The invention relates to an electrical appliance for preparing food, comprising:
  a housing in which several electric incandescent lamps are accommodated side by side,
  a carrier for food positioned opposite the electric incandescent lamps,
  the incandescent lamps each having a tubular lamp vessel which is closed in a vacuumtight manner and in which a coiled incandescent body is axially arranged and connected to current conductors which issue through respective end portion of the lamp vessel to the exterior. The invention also relates to an electric incandescent lamp for use in said appliance.

BACKGROUND OF THE INVENTION

Such an electrical appliance is known from DE 32 12 548. The appliance may be used for grilling or toasting of food such as meat, bread, etc.

A disadvantage of the known device is that areas on the carrier facing a lamp which is positioned between other lamps receive more radiation than areas facing a lamp which has only one adjoining lamp.

The carrier, and thus the food supported by it, is accordingly irradiated in an uneven manner. This involves a risk that food receives locally too much and elsewhere too little radiation during an irradiation period.

SUMMARY OF THE INVENTION

The invention has for its object to provide an electrical appliance of the kind described in the opening paragraph, and an electric lamp for use therein, which render possible inter alia a more even irradiation of the carrier, and thus of the food supported thereby.

According to the invention, this object is achieved in that the lamp vessel is bent into a U-shape so as to form a first and a second leg positioned at a distance from one another e.g., adjacent each other in spaced apart relationship and accommodating a first and a second portion, respectively, of the incandescent body,
  the first portion of the incandescent body consuming a higher power than the second portion, and
  a first and a second incandescent lamp being arranged with their second legs next to one another. It can be achieved through the construction and the position of the first and second incandescent lamp that areas of the carrier facing a second leg, and therefore receiving a substantial quantity of radiation from this second leg as well as from the first leg of the same lamp and from the second leg of the other lamp, do not receive substantially more radiation than areas facing a first leg.

It is furthermore attractive that the electric wiring of the appliance is simplified since the lamps all have end portions which are situated next to one another, to which the electrical supply can be connected. This simplification is greatest when the end portions of the first lamp lie next to those of the second lamp.

It is advantageous to use an incandescent body whose second portion is subdivided into light-emitting and substantially non-light-emitting sections. The second portion may then have the same length as the first portion without the incandescent body having to be assembled from a first portion consisting of a first kind of wire and a second portion consisting of a second kind of wire, each possibly coiled with its own pitch and/or around a mandrel having a distinctive diameter. It is also advantageous that this segmentation can render the radiant intensity of the second leg in its longitudinal direction more uniform.

In a preferred embodiment, the first portion of the incandescent body is also segmented.

It is preferred in the case of segmentation for the relevant portion to have comparatively many or comparatively long light-emitting sections near its ends, and relatively few or relatively short ones remote from its ends.

A particular for pattern of the sections may be ascertained by those skilled in the art after only a few experiments, in dependence on the geometry of the electrical appliance. The same holds for the ratio of the powers to be consumed by the first and the second portion. This ratio will generally lie between approximately 70:30 and 55:45, for example 60:40.

The incandescent body may be emitting also between the first and the second portion of the incandescent body. It is preferred in that case for the evenness of the irradiation of the carrier that the said intermediate portion projects outside the carrier or is otherwise screened from the carrier. For an efficient use of energy, however, in especially preferred embodiments the first and the second section of the incandescent body are interconnected by a substantially non-light-emitting section.

BRIEF DESCRIPTION OF THE INVENTION

Embodiments of the electrical appliance and of the electric incandescent lamp according to the invention are shown in the drawing, in which
  FIG. 1 is a cross-section of the electrical appliance; and
  FIGS. 2a, 2b show a first and a second embodiment of the electric incandescent lamp.

DETAILED DESCRIPTION OF PREFERRED EMBODIMENTS

In FIG. 1, the electrical appliance for preparing food comprises a housing 1 in which several electric incandescent lamps 2, 2' are accommodated next to one another.

A carrier 3 for food is arranged opposite the electric incandescent lamps.

The incandescent lamps 2, 2' have a tubular lamp vessel 4 which is closed in a vacuumtight manner and in which a coiled incandescent body 5 is axially positioned and connected to current conductors 6 which issue to the exterior through respective end portions 7 of the lamp vessel 4.

The lamp vessel is bent into a U-shape so as to form a first 8 and a second 9 leg positioned at a distance from one another and accommodating a first 10 and a second 11 portion, respectively, of the incandescent body 5. The first portion 10 of the incandescent body 5 consumes a higher power than does the second portion 11. A first 2 and a second 2' incandescent lamp are arranged with their second legs 9 next to one another.

In the Figure, the first and the second portion of the incandescent body have substantially the same length. The difference in power consumption, for example 60 and 40% of the total power, results from the difference in design between said portions, for example variation in wire diameter, mandrel diameter, and/or pitch.

The two portions 10, 11 of the incandescent body are interconnected by a portion 16 which emits substantially no light and which, compared with the first and the second portion, consumes practically no power given its length.

The end portions 7 of the lamps 2, 2' lie next to one another at one side of the appliance.

The appliance shown may be used for grilling or toasting of food.

In FIGS. 2a and 2b, parts corresponding to those in FIG. 1 are given reference numerals which are 20 higher.

In FIG. 2a, the first 30 and the second 31 portion of the incandescent body are integral with the non-light-emitting, connecting portion 36. The second portion 31 is subdivided into light-emitting 32 and substantially non-light-emitting sections 33.

In FIG. 2b, the first portion 50 of the incandescent body 45 is also subdivided into light-emitting 54 and substantially non-light-emitting sections 55. The lamp shown has a tungsten incandescent body and is filled with an inert gas which comprises hydrogen bromide. Alternatively, however, the lamp may be filled exclusively with an inert gas.

We claim:

1. An electrical appliance for preparing food, comprising:
    a housing (1) in which several electric incandescent lamps (2) are accommodated side by side,
    a carrier (3) for food positioned opposite and underneath the electric incandescent lamps in facing relationship therewith,
    the incandescent lamps (2,2') each having a tubular lamp vessel (4) which is closed in a vacuumtight manner and in which a coiled incandescent body (5) is axially arranged and connected to current conductors (6) which issue to the exterior through respective end portions (7) of the lamp vessel to the exterior,
    wherein the lamp vessel (4) is bent into a U-shape so as to form a first (8) and a second (9) leg positioned at a distance from one another and accommodating a first (10) and a second (11) portion, respectively, of the incandescent body (5),
    the first portion (8) of the incandescent body (5) consuming a higher power than does the second portion (9), and
    a first (2) and a second (2') incandescent lamp being arranged with their second legs next to one another.

2. An electrical appliance as claimed in claim 1, characterized in that the second portion (31) of the incandescent body (25) is subdivided into light-emitting (32) and substantially non-light-emitting sections (33).

3. An electrical appliance as claimed in claim 2, characterized in that also the first portion (50) of the incandescent body (45) is subdivided into light-emitting (54) and substantially non-light-emitting sections (55).

4. An electrical appliance as claimed in claim 3 wherein the first and the second portion of the incandescent body are interconnected by a substantially non-light-emitting section (56).

5. An electrical appliance as claimed in claim 2 wherein the first and the second portion of the incandescent body are interconnected by a substantially non-light-emitting section (56).

6. An electrical appliance as claimed in claim 1, characterized in that the first and the second portion of the incandescent body are interconnected by a substantially non-light-emitting section (56).

7. An electrical appliance as claimed in claim 1, characterized in that the end portions (7) of the first (2) and the second (2') incandescent lamp lie next to one another.

8. An electric incandescent lamp, effective to evenly irradiate food positioned underneath and in facing relationship therewith, which lamp comprises a tubular lamp vessel (4) which is closed in a vacuumtight manner and in which a coiled incandescent body (5) is axially arranged and connected to current conductors (6) which issue to the exterior through respective end portions (7) of the lamp vessel (4),
    wherein the lamp vessel (4) is bent into a U-shape so as to form a first (8) and a second (9) leg situated at a distance from one another and accommodating a first (10) and a second (11) portion, respectively, of the incandescent body (5),
    the first portion (10) of the incandescent body (5) consuming a higher power than does the second portion (11), the ratio of the powers consumed by the first and second portions being between about 70:30 and about 55:45.

9. An electric incandescent lamp as claimed in claim 6, characterized in that the second portion (31) of the incandescent body (25) is subdivided into light-emitting (32) and substantially non-light-emitting (33) sections.

10. An electric incandescent lamp as claimed in claim 7, characterized in that also the first portion (50) of the incandescent body (45) is subdivided into light-emitting (54) and substantially non-light-emitting (55) sections.

11. An electric incandescent lamp as claimed in claim 10 wherein the first (50) and the second (51) portion of the incandescent body (55) are interconnected by a substantially non-light-emitting section (56).

12. An electric incandescent lamp as claimed in claim 7, characterized in that the first (50) and the second (51) portion of the incandescent body (55) are interconnected by a substantially non-light-emitting section (56).

* * * * *